United States Patent [19]

Miyata et al.

[11] Patent Number: 5,891,945
[45] Date of Patent: Apr. 6, 1999

[54] MAGNESIUM HYDROXIDE SOLID SOLUTIONS, THEIR PRODUCTION METHOD AND USE

[75] Inventors: Shigeo Miyata, Kitakyushu; Mitsuru Koresawa, Takatsuki; Yasunori Kitano, Ako; Hirofumi Kurisu, Ako; Toshikazu Kotani, Ako; Kiminari Tottotsu, Ako, all of Japan

[73] Assignee: Tateho Chemical Industries, Co., Ltd., Ako, Japan

[21] Appl. No.: 824,331

[22] Filed: Mar. 26, 1997

Related U.S. Application Data

[63] Continuation of Ser. No. 458,899, Jun. 2, 1995, abandoned.

[51] Int. Cl.$^6$ .............................. C08K 3/10; C01G 45/12
[52] U.S. Cl. ....................... 524/4.3; 423/594; 423/599; 423/604; 523/210; 524/436
[58] Field of Search .................... 524/413, 436; 523/210; 423/594, 599, 604

[56] References Cited

U.S. PATENT DOCUMENTS

| | | | |
|---|---|---|---|
| 5,143,965 | 9/1992 | Mertz | 524/436 |
| 5,264,284 | 11/1993 | Miyata | 428/364 |
| 5,344,636 | 9/1994 | Miyata | 423/593 |
| 5,401,442 | 3/1995 | Miyata | 252/609 |
| 5,571,526 | 11/1996 | Miyata . | |
| 5,583,172 | 12/1996 | Imahashi et al. . | |

FOREIGN PATENT DOCUMENTS

| | | |
|---|---|---|
| 0 498 566 A1 | 8/1992 | European Pat. Off. . |
| 0 517 448 A1 | 9/1992 | European Pat. Off. . |
| 0 498 566 A1 | 12/1992 | European Pat. Off. . |
| 0 544 502 A1 | 2/1993 | European Pat. Off. . |
| 5-112669 | 5/1993 | Japan . |
| 5-209084 | 8/1993 | Japan . |
| 5-255532 | 10/1993 | Japan . |
| 6-41441 | 2/1994 | Japan . |
| 6-87979 | 3/1994 | Japan . |
| 6-157032 | 6/1994 | Japan . |
| 7-2518 | 1/1995 | Japan . |

OTHER PUBLICATIONS

Patent Abstracts of Japan, vol. 95, No. 003; JP–A–07 061 812 (Abstract).
JP–A–5 112 669 (Abstract).

*Primary Examiner*—Veronica P. Hoke
*Attorney, Agent, or Firm*—Armstrong, Westerman, Hattori, McLeland & Naughton

[57] ABSTRACT

A production method of a magnesium hydroxide solid solution, $Mg_{1-x}M^{2+}{}_x(OH)_2$ or a resin and/or rubber material having as its effective elements containing said solid solution as its flame retardant, characterized by having $M^{2+}$ distributed unevenly in a high concentration in the vicinity of the surface of each crystal, in the magnesium solid represented by the formula $Mg_{1-x}M^{2+}{}_x(OH)_2$ wherein $M^{2+}$ is at least one divalent metal ion selected from the group consisting of $Mn^{2+}$, $Fe^{2+}$, $Ni^{2+}$, $Cu^{2+}$, $Zn^{2+}$ and x indicates a range of $0.001 \leq x < 0.5$.

8 Claims, No Drawings

MAGNESIUM HYDROXIDE SOLID SOLUTIONS, THEIR PRODUCTION METHOD AND USE

This application is a continuation of application Ser. No. 08/458,899 filed Jun. 2, 1995, now abandoned.

FIELD OF THE INVENTION

This invention relates to a new type of magnesium hydroxide solid solution and its method of production, and a flame retardant material and/or rubber composition containing a magnesium hydroxide solid solution in the resin and/or rubber and a flame retardant material containing magnesium hydroxide solid solution as its effective element.

More precisely, by having the divalent transition metal distributed mainly in the vicinity of the surface of the crystals of the magnesium hydroxide solid solution, it is possible to bring about a new type of magnesium hydroxide solid solution which results in the greatest effectiveness of the transition metal with the minimum amount of concentration. The invention also involves the method of production thereof, and a resin and/or rubber material which exhibits superior flame retardancy, mechanical strength and acid resistance, and a flame retardant having as its effective element a magnesium hydroxide solid solution.

BACKGROUND OF THE INVENTION

There has been a growing strong demand for flame retardant resin and rubber. However, there is a strong request to limit to a safe method by employing metallic hydroxide material as a means of making them flame retardant rather than using the current common method by a halogen type flame retardant material which simultaneously uses halogen and antimony trioxide. However, even magnesium hydroxide which has the fewest drawbacks among the metallic hydroxide materials requires a rather large amount of combination of about 70 weight % with respect to about 30 weight % of the resin and/or rubber to reach the targeted level of flame retardancy. Therefore, there is a problem caused in that an unacceptable degree of loss in some characteristics of the resin and rubber.

At this point, one of the inventors proposed a magnesium hydroxide solid solution having divalent transition metal represented as the general formula (1);

$$Mg_{1-x}M^{2+}{}_x(OH)_2 \qquad (1)$$

wherein $M^{2+}$ denotes at least one type of divalent metal selected from the group consisting of $Mn^{2+}$, $Fe^{2+}$, $Co^{2+}$, $Ni^{2+}$, $Cu^{2+}$ and $Zn^{2+}$, and x indicates a range of $0.001 \leq x \leq 0.9$. When this magnesium hydroxide solid solutions is compounded in the resin and/or rubber, flame retardancy and acid resistance are greatly improved, and as a result, the targeted level of flame retardancy can be reached with a minimum amount smaller than that of conventional magnesium hydroxide.

However, as a result of further research, several problems to be solved for the magnesium hydroxide solid solution shown by the general formula (1) were found. The first problem was that compared with the magnesium raw material, the $M^{2+}$ material is expensive, in particular, there is a problem of Co and Ni being expensive. For example, for the $Mg_{1-x}Ni_x(OH)_2$ type magnesium hydroxide solid solution with a range of x being $0.2 \leq x \leq 0.6$, the flame retardancy and the acid resistance clearly show improvement compared with magnesium hydroxide. However, the solid solution containing just that amount of Ni, is very expensive compared with magnesium hydroxide. The second problem was that along with the increase of the $M^{2+}$ contained, the crystal growth of the magnesium hydroxide solid solution and the dispersibility become worse. However, such a level differs according to the type of the $M^{2+}$ contained.

The present inventors carefully conducted research to resolve the above mentioned issues. As a result, the reason that the magnesium hydroxide solid solution showed superior flame retardancy compared with magnesium hydroxide was discovered. This is due to the catalytic effects of the $M^{2+}$ contained and the lower starting temperature of the dehydration compared with that of the magnesium hydroxide. Further, it was found out that the catalytic effects contribute to improvement in flame retardancy compared with the lower starting temperature of dehydration.

At this point, at least for the catalytic effects of the $M^{2+}$, it was surmised that just the $M^{2+}$ exposed on the surface of the magnesium hydroxide solid solution in contact with the resin or the rubber of having the possibility to contact this, contributed to this effect. Therefore, if it were possible to place $M^{2+}$ selectively in the vicinity of the surface of the magnesium hydroxide crystals, compared with when the $M^{2+}$ is distributed homogeneously in the magnesium hydroxide crystals, it was thought that it would be possible to work the same catalytic effect with an extremely smaller amount of $M^{2+}$ compared to when the $M^{2+}$ is distributed homogeneously. Furthermore, in the vicinity of the surface of the crystals of the magnesium hydroxide solid solution wherein the $M^{2+}$ is unevenly distributed with a high concentration in the vicinity of the surface of the magnesium hydroxide, the amount of the crystal water dehydrating at a low temperature is said to be smaller than in the case when the $M^{2+}$ is distributed evenly over the entire surface of the crystals in a high concentration because a dehydration of the crystal water is supposed to take place at a temperature lower than that for the magnesium hydroxide. However, this effect is supposed to contribute to flame retardancy to some degree.

OBJECT OF THE INVENTION

Accordingly one object of the invention was to provide a particular magnesium hydroxide solid solution based on the above concept. In other words, the invention provides magnesium hydroxide solid solution represented as the formula (2);

$$Mg_{1-x}M^{2+}{}_x(OH)_2 \qquad (2)$$

wherein $M^{2+}$ denotes at least one type of divalent metal ion selected from the group consisting of $Mn^{2+}$, $Fe^{2+}$, $Co^{2+}$, $Ni^{2+}$, $Cu^{2+}$ and $Zn^{2+}$, and x indicates a range of $0.001 \leq x < 0.5$, preferably $0.005 \leq x \leq 0.2$, more preferably $0.001 \leq x \leq 0.1$, characterized by $M^{2+}$ distributed unevenly in a high concentration in the vicinity of the surface of each crystal.

Further, the invention provides the above mentioned magnesium hydroxide solid solution whereby the level of the concentration of the $M^{2+}$ distributed unevenly in the vicinity of the surface of each crystal is at lease twice, and preferably 5 times that of the average concentration of the $M^{2+}$ in the magnesium hydroxide solid solution.

Furthermore, the invention provides a flame retardant material containing the above mentioned magnesium hydroxide solid solution as the effective material.

Even further, the invention provides a flame retardant resin and/or rubber composition wherein 20 to 250 weight parts of the above mentioned flame retardant material is combined with 100 weight parts of resin and/or rubber.

Further still, the invention provides a production method for the above mentioned magnesium hydroxide solid solution.

DISCLOSURE OF THE INVENTION

In the magnesium hydroxide solid solution of the formula (2), crystals are in a diameter of 0.2 to 4 µm, more preferably a range of 0.4 to 2 µm and also it is preferable to use one which has practically no or less secondary aggregates. Also, a BET specific surface area is preferably 1 to 20 $m^2/g$, more preferably 3 to 10 $m^2/g$. The above mentioned range for the magnesium hydroxide solid solution is the suitable range for maintaining the compatibility with resin, dispersibility, moldability, processability, the surface appearance of the product, the mechanical strength and the flame retardancy contained in the resin and/or rubber.

In the magnesium hydroxide solid solution mentioned of the formula (2), $M^{2+}$ is at least one divalent metal ion selected from the group consisting of $Mn^{2+}$, $Fe^{2+}$, $Co^{2+}$, $Ni^{2+}$, $Cu^{2+}$ and $Zn^{2+}$. When $M^{2+}$ consists of a plurality of divalent metal ions, x is a total of these metal ions. Among the above mentioned divalent ions, Ni, Co and Mn are preferable, and particularly Ni and Mn are preferable. Ni, along with showing remarkable results in improving acid resistance, is also superior in terms of flame retardancy and in heat aging resistance. Mn, along with being particularly superior in terms of flame retardancy, is white and can be easily colored.

The magnesium hydroxide solid solution of this invention, different from the magnesium hydroxide solid solution in which the $M^{2+}$ is distributed homogeneously, the concentration of the $M^{2+}$ in the vicinity of the surface of the crystals measured by XPS or Auge, is remarkably denser than the concentration x of the $M^{2+}$ measured by chemical analysis. Furthermore, for most of the $M^{2+}$, for example for the Ni, the speed of the initial acid reaction measured by the PH STAT method, is remarkably slow compared with when distributed homogeneously.

Next, an explanation of the production method for the magnesium hydroxide solid solution of the present invention is explained. Production can be carried out by adding, with sufficient stirring, the $M^{2+}$ aqueous solution in the aqueous solution in which magnesium hydroxide is evenly dispersed or in the magnesium hydroxide aqueous solution wherein at least one type of chlorine selected from the group consisting of magnesium chloride, sodium chloride, calcium chloride, is dissolved in the aqueous solution, and reacting thereof. The reaction temperature is about 20° to 200° C., preferably 70° to 150° C. Although the reaction time differs according to the reaction temperature, it is about 0.1 to 5 hours, more preferably 0.2 to 2 hours. Also, a lower level of the concentration of the $M^{2+}$ is preferable.

Based on the production method for the magnesium hydroxide solid solution for the above mentioned invention, it is possible to place the $M^{2+}$ just in the vicinity of the surface of the magnesium hydroxide without harmful effects on the diameter of the crystal particles of the magnesium hydroxide which is the starting material or on the dispersibility.

It is possible to produce the magnesium hydroxide used in this invention with various methods. For example, after adding, with sufficient stirring, 0.5 to 0.95 per equivalent of Mg of such alkali as calcium hydroxide at 40° C. or lower, preferably 30° C. or lower, to the magnesium in the aqueous solution containing magnesium ions such as magnesium chloride, and causing a reaction. After that, with the mother liquor, the reaction is proceeded hydrothermally at 100° to 200° C. for several hours. For example, it can be produced by means of hydration by putting magnesium oxide subjected to high temperature calcining at a temperature of about 1,200° to 1,600° C. in presence of such monovalent acids as acetic acid.

The magnesium hydroxide solid solution of the present invention can be directly used as a flame retardant. Further, the magnesium hydroxide solid solution of the present invention may be surface-treated with at least one surface treating agent selected from the group consisting of higher fatty acids, anionic surfactants, phosphate esters, coupling agents (of silane, titanate or aluminium type) and esters of polyhydric alchohols and fatty acids.

The surface treating agent is preferably selected from higher fatty acids having 10 or more carbon atoms such as stearic acid, oleic acid, erucic acid, palmitic acid, lauric acid, and behenic acid; alkali metal salts thereof; sulfates of higher alcohols such as stearyl alcohol and oleyl alcohol; anionic surfactants such as a salt of sulfate of polyethylene glycol ether, a salt of amide-bonded sulfate ester, a salt of ester-bonded sulfonate, amide-bonded sulfonate, ether-bonded sulfonate, ether-bonded alkylallyl sulfonate, ester-bonded alkylallyl sulfonate, and amide-bonded alkylallyl sulfonate; phosphate esters such as mono- or diesters of orthophosphoric acid with oleyl alcohol and stearyl alcohol, mixtures of these, acid type or alkali metal salts or amine salts thereof; silane-coupling agents such as vinylethoxysilane, vinyl-tris(2-methoxy-ethoxy)silane, ipsylon-methacryloxypropyltrimethoxysilane, ipsylon-aminopropyltrimethoxysilane, beta-(3,4epoxycyclohexyl) ethyltrimethoxysilane, ipsylon-glycidioxypropyltrimethoxysilane, and ipsylon-mercaptopropyltrimethoxysilane, titanate coupling agents such as isopropyltriisostearoyl titanate, isopropyltris (dioctylpyrophosphate) titanate, isopropyltri(N-aminoethyl-aminoethyl) titanate and isopropyltridecylbenzenesulfonly titanate; aluminium coupling agents such as acetoalkoxyalminium diisopropylate; and esters of polyhydric alcohols and fatty acids such as glycerin monostearate, and glycerin monooleate.

The surface coating treatment of the magnesium hydroxide solid solution of the formula (2) with the surface treating agent can be carried out by a wet or dry method which itself is known to the public. For example, a wet method may be carried out by adding a liquid or an emulsion of the surface treating agent to the magnesium hydroxide solid solution and mechanically mixing the mixture, sufficiently, at a temperature up to about 100° C. A dry method may be carried out by adding a liquid, an emulsion, or a solid of the surface treating agent to a powder of the magnesium hydroxide solid solution, while the powder is sufficiently stirred with a stirrer such as a Henschel mixer, and sufficiently mixing the mixture with or without heating. The amount of the surface treating agent may be freely selected, but it is preferably about 0.1 to about 10% by weight based on the weight of the magnesium hydroxide solid solution. The surface-treated magnesium hydroxide solid solution may be washed with water, dehydrated, granulated, dried, milled, and classified as required to give a final product.

Examples of the resin and/or rubber to be used in the present invention include thermoplastic resins such as polyethylene, a copolymer of ethylene with other α-olefin, a copolymer of ethylene with vinyl acetate, ethyl acrylate or methyl acrylate, polypropylene, a copolymer of propylene with other α-olefin, PVC, polybutene-1, polystyrene, a styrene-acrylonitrile copolymer, a copolymer of ethylene with propylendiene rubber orbuteadiene, vinyl acetate, polyacrylate, polymethacrylate, polyurethane, polyester, polyether, polyamide and the like; thermosetting resins such as phenolic resin, melamine resin, epoxy resin, unsaturated polyester resin, alkyd resin and the like; EPDM, SBR, NBR, butyl rubber, isoprene rubber, chlorosulfonated polyethylene and the like, but the resin and rubber are not limited to them.

In the present invention, the amount of the magnesium hydroxide solid solution of the formula (2) for the resin and/or rubber can be suitably selected depending upon the kind of the resin and/or rubber and the kind of the magnesium hydroxide solid solution of the formula (2). In general, the amount of the magnesium hydroxide solid solution of the formula (2) which is surface-treated or not surface-treated, is about 20 to 250 parts by weight, preferably about 30 to about 200 parts by weight, based on 100 parts by weight of the resin and/or rubber. When the amount of the magnesium hydroxide solid solution of the formula (2) is less than the above lower limit, the flame retardancy is insufficient. On the other hand, when this amount exceeds the above upper limit, disadvantageously, the tensile strength, the Izod impact strength, etc., may sometimes decrease, or the acid resistance may sometimes deteriorate. Therefore, it is preferable to select the amount within the above range.

The method for mixing or kneading the resin and/or magnesium hydroxide solid solution of the formula (2) is not specifically limited, and any means may be employed if a uniform mixture can be prepared. For example, the mixing or kneading can be carried out using a single-screw or twin-screw extruder, a roll, a Banbury mixer and the like. Neither is the method for processing or molding the composition specifically limited, and any known molding means can be used according to the kind of the resin and/or rubber and kind of the article to be molded. For example, the composition can be molded by injection molding, extrusion, blow molding, press molding, rotational molding, calendering, sheet forming, transfer molding, laminate molding, vacuum molding and the like.

The flame retardant resin and/or rubber composition of the present invention may contain other additives in addition to the magnesium hydroxide solid solution of the formula (2), if necessary. For example, there may be used a flame-retardant aid containing at least one sort of carbon powder, ferrocene, anthracene, polyacetylene, red phosphorous, acrylic fiber, nickel oxide, and fibrous magnesium hydroxide. The amount of the flame-retardant aid is preferably used in an amount of about 0.1 to 10 parts by weight based on 100 parts by weight of the resin and/or rubber.

Further, a lubricant which can also work for improving water resistance and acid resistance (whitening preventor) may be used as required. The lubricant is selected from zinc behenate, magnesium behenate, zinc stearate, calcium stearate, magnesium stearate, lead stearate, and aluminium stearate. The lubricant is used in the amount of about 0.1 to 10 parts by weight based on 100 parts by weight of the resin and/or rubber.

The flame-retardant resin composition of the present invention may further contain other conventional additives such as antioxidants, ultraviolet inhibitors, antistatic agents, pigments, anti foaming agents, plasticizers, fillers, reinforcing materials, organohalogen flame retardants, crosslinking agents and the like. The following Examples and Comprative Examples illustrate the present invention in detail but are not to limit the scope thereof.

In Examples and Comparative Examples, "parts" and "%'s" are by weight unless otherwise stated.

EXAMPLE 1

Calcium hydroxide corresponding 0.9 equivalent to Mg (hereinafter just abbreviated to eq.) synthesized by adding sodium hydroxide (1 eq., 2 mols/L) to calcium chloride (2 mols/L) was added to a magnesium component in an ionic bittern containing magnesium chloride (2.0 mols/L) and calcium chloride (0.8 mols/L) at 25° C., and the mixture was stirred. The magnesium hydroxide reactive material was charged in an autoclave as it is without washing and subjected to a hydrothermal treatment under pressure at 170° C. for 2 hours. The magnesium hydroxide obtained had an average secondary particle size of 0.81 $\mu$m, a BET specific surface area of 7.0 $m^2$/g, and it formed a sufficiently grown crystal which was dispersed.

Magnesium hydroxide taken out of the autoclave was maintained at 70° C. and an aqueous nickel chloride solution (0.2 mols/l) was added to magnesium hydroxide with stirring in the amount corresponding to a molar ratio (Ni/Mg) of 0.02. After the resultant mixture was reacted at 70° C. for one hour, the reaction product was filtered, partially dehydrated and dried. Almost all of the remainder was dispersed again in hot water at 80° C. and hot water wherein sodium stearate was dissolved in the amount of 3% for the weight of the magnesium hydroxide solid solution was added at 80° C. with stirring. After maintaining for about 30 minutes, the resultant mixture was subjected to a surface treatment, filtered, washed with water, dehydrated, granulated and dried.

The chemical composition was determined by means of the chelatometric titration method, and the composition of the surface of the crystal was determined by means of XPS. The BET specific surface area was measured by means of the nitrogen adsorption method, and the average secondary particle size was measured by means of the microtrack method after subjecting a sample powder to an ultrasonic dispersing treatment in an aqueous 0.2% sodium hexametaphosphate. The acid resistance was determined as follows, that is, 200 mg of a test powder was added to 100 ml of deionized water adjusted to pH 4 and the time (minute) required to consume 10.3 ml corresponding to 15 molar % of 1/10N HCl was measured while maintaining pH 4 by means of the ph stat method ($T_{15}$).

The chemical composition, the chemical composition of the surface of the crystal, the acid resistance, the BET specific surface and the average secondary particle size of the sample which was not subjected to the surface treatment were determined. The results are shown in Table 1.

EXAMPLE 2

In Example 1, after the completion of the hydrothermal treatment, the resulting magnesium hydroxide was cooled to 110° C. Then, an aqueous nickel solution (0.2 mols/L) was added in the amount corresponding to a molar ratio (Ni/Mg) of 0.02 in the autoclave using a plunger pump and resultant mixture was maintained with stirring at 110° C. for one hour. Thereafter, the resultant mixture was subjected to a surface treatment, filtered, washed with water, dehydrated, granulated and dried according to the same manner as that described in Example 1. The evaluation results of the product are shown in Table 1.

EXAMPLE 3

In Example 1, magnesium hydroxide taken out of the autoclave was filtered, washed with water and dispersed again in water. Then, an aqueous nickel solution (0.4 mols/L) was added at 25° C. in the amount corresponding to a molar ratio (Ni/Mg) of 0.02 with stirring and, after stirring for additional 30 minutes, the resultant mixture was transferred to the autoclave and subjected to a hydrothermal treatment at 140° C. for one hour. Thereafter, the mixture was subjected to a surface treatment, filtered, washed with water, dehydrated, granulated and dried according to the same manner as that described in Example 1. The evaluation results of the product are shown in Table 1.

EXAMPLES 4 AND 5

According to the same manner as that described in Example 2 except for changing the amount of the aqueous nickel chloride solution to the molar ratio (Ni/Mg) of 0.01 (EXAMPLE 4) and 0.05 (EXAMPLE 5), respectively, the operation was carried out. The evaluation results of the product are shown in Table 1.

COMPARATIVE EXAMPLE 1

In example 1, some of the magnesium hydroxide subjected to a hydrothermal treatment in the autoclave was filtered, washed with water and dried. The remainder was filtered, washed with water and dispersed again in water. Then, an aqueous solution prepared by dissolving sodium stearate in the amount of 3% for the weight of magnesium hydroxide was added with stirring at 80° C. and the mixture was subjected to a surface treatment. Thereafter, the resultant mixture was filtered, washed with water, dehydrated and dried. The evaluation results of the product are shown in Table 1.

COMPARATIVE EXAMPLES 2 AND 3

To 40 L (20° C.) of an aqueous mixed solution of magnesium chloride and nickel chloride ($Mg^{2+}$=0.8 mols/L, $Ni^{2+}$=0.3 mols/L, Comparative Example 2) ($Mg^{2+}$=1.1 mol/L, $Ni^{2+}$=0.01 mol/L, Comparative Example 3), 18 L (20° C.) of calcium hydroxide (2 mols/L) was added with stirring. Both reaction products and mother liquor were transferred to the autoclave and they were subjected to a hydrothermal treatment at 175° C. for 4 hours. Thereafter, some of the mixture was filtered, washed with water and dried and the remainder was filtered, washed with water, dispersed in water and subjected to a surface treatment with sodium stearate according to the same manner as that described in Example 1. Thereafter, the resultant mixture was filtered, washed with water, dehydrated, granulated and dried.

TABLE 1

| | Average chemical composition Ni/Mg molar ratio | Surface chemical composition Ni/Mg molar ratio | BET $m^2/g$ | Average secondary particle size ($\mu$m) | Acid resistance ($T_{1.5}$) (min) |
|---|---|---|---|---|---|
| Example | | | | | |
| 1 | 0.02 | 0.32 | 7.7 | 0.78 | 86 |
| 2 | 0.02 | 0.27 | 7.1 | 0.80 | 71 |
| 3 | 0.02 | 0.24 | 7.5 | 0.71 | 62 |
| 4 | 0.01 | 0.13 | 7.0 | 0.80 | 20 |
| 5 | 0.05 | 0.62 | 7.1 | 0.81 | 112 |
| Comparative Example | | | | | |
| 1 | 0 | 0 | 7.0 | 0.81 | 1.5 |
| 2 | 0.30 | 0.30 | 8.2 | 0.70 | 80 |
| 3 | 0.01 | 0.01 | 7.6 | 0.76 | 3.0 |

EXAMPLE 6

In Example 1, magnesium hydroxide was subjected to a hydrothermal treatment in an autoclave, cooled to 110° C. and, after substituting the autoclave with nitrogen, an aqueous solution of cobalt chloride [0.1 mols/L, molar ratio (Co/Mg) corresponds to 0.02] was added using a plunger pump, followed by maintaining at 110° C. for one hour. Thereafter, the mixture was subjected to a surface treatment, filtered, washed with water, dehydrated, granulated and dried. The evaluation results of the product are shown in Table 2.

EXAMPLE 7

According to the same manner as that described in Example 6 except for using manganese nitrate in the amount corresponding to a molar ratio (Mn/Mg) of 0.01 in place of cobalt chloride, the operation was carried out. The evaluation results of the product are shown in Table 2.

EXAMPLE 8

According to the same manner as that described in Example 6 except for using ferrous chloride in place of cobalt chloride, the operation was carried out. The evaluation results of the product are shown in Table 2.

EXAMPLES 9 AND 10

In Example 3, in place of nickel chloride, 0.1 mol/L of cupric nitrate (Example 9) or an aqueous mixed solution of zinc nitrate and nickel chloride ($Zn^{2+}$=0.1 mols/L, $Ni^{2+}$=0.1 mols/L, Example 10) was added to magnesium hydroxide so that a molar ratio of Cu/Mg and (Zn+Ni)/Mg may become 0.01, respectively, and the reluctant mixture was heated to 100° C. with stirring and maintained at the same temperature for one hour. Thereafter, a part of the mixture was filtered, washed with water and dried, and the remainder was subjected to a surface treatment according to the same manner as that described in Example 1. The evaluation results of the product are shown in Table 2.

TABLE 2

| Example | Average chemical composition Ni/Mg molar ratio | Surface chemical composition Ni/Mg molar ratio | BET $m^2/g$ | Average secondary particle size ($\mu$m) |
|---|---|---|---|---|
| 6 | 0.02 | 0.28 | 7.2 | 0.80 |
| 7 | 0.01 | 0.15 | 7.5 | 0.81 |
| 8 | 0.02 | 0.25 | 6.9 | 0.82 |

TABLE 2-continued

| Example | Average chemical composition Ni/Mg molar ratio | Surface chemical composition Ni/Mg molar ratio | BET m²/g | Average secondary particle size (μm) |
|---|---|---|---|---|
| 9 | 0.01 | 0.16 | 7.0 | 0.83 |
| 10 | 0.01 | 0.14 | 7.1 | 0.80 |

EXAMPLES 11 TO 15 AND COMPARATIVE EXAMPLES 4 TO 6

The surface-treated magnesium hydroxide solid solution or magnesium hydroxide obtained in Examples 1 to 10 or Comparative Examples 1 to 3 was mixed with 100 parts of an ethylene-propylene copolymer in the formulation ratio shown in Table 3, respectively. Then, the mixture was kneaded at about 230° C. with an extruder, and the resulting pellets were vacuum-dried and subjected to injection molding to prepare a test piece. The flammability and mechanical strength of the test piece were measured. The results are shown in Table 4. Incidentally, the flammability was determined by subjecting a test piece of 1/16 inch in thickness to a UL94VE test.

TABLE 3

| Example | Flame-retardant | Amount | $M^{2+}$ | x of formula (1) |
|---|---|---|---|---|
| Example | | | | |
| 11 | Example 1 | 145 | Ni | 0.02 |
| 12 | Example 2 | 150 | Ni | 0.02 |
| 13 | Example 3 | 150 | Ni | 0.02 |
| 14 | Example 4 | 170 | Ni | 0.01 |
| 15 | Example 5 | 130 | Ni | 0.05 |
| Comparative Example | | | | |
| 4 | Comparative Example 1 | 205 | — | 0 |
| 5 | Comparative Example 2 | 145 | Ni | 0.3 |
| 6 | Comparative Example 3 | 195 | Ni | 0.01 |

Note:
In the respective Examples and Comparative Examples, 0.1 parts of Irganox 1010 (manufactured by Chibageigy Inc.) and 0.1 parts of Weston 626 (manufactured by GE Co.) were formulated as the antioxidant.

TABLE 4

| | Combustibility | Tensile strength (kg · f/mm²) | Elongation (%) | Izod impact strength (kg · cm/cm) |
|---|---|---|---|---|
| EXAMPLE | | | | |
| 11 | V-0 | 1.75 | 30 | 15 |
| 12 | V-0 | 1.73 | 26 | 12 |
| 13 | V-0 | 1.72 | 25 | 11 |
| 14 | V-0 | 1.68 | 18 | 10 |
| 15 | V-0 | 1.86 | 42 | 20 |
| COMPARATIVE EXAMPLE | | | | |
| 4 | V-0 | 1.60 | 5 | 6 |
| 5 | V-0 | 1.71 | 24 | 13 |
| 6 | V-0 | 1.64 | 8 | 7 |

Note:
The Izod impact strength was measured using a test piece with a notch (1/16 inch in thickness).

As shown in the results of Tables 3 and 4, the minimum amount of magnesium hydroxide required to meet the "V-0" level of a UL94VE test in the combustibility test using a test piece of 1/16 inch in thickness was 205 parts. In case of the non-uniformly distributed solid solution of the present invention, it was possible to meet the "V-0" level when using about 150 parts of it in combination with 2 molar % of nickel. This corresponds to the solid solution wherein about 30 molar % of nickel is uniformly distributed.

EXAMPLES 16 TO 20 AND COMPARATIVE EXAMPLE 7

The surface-treated magnesium solid solution or the magnesium hydroxide obtained in Examples 6 to 10 or Comparative Example 1 was mixed with 100 parts of nylon 6 in the formulation ratio shown in Table 5, respectively. Then, the mixture was kneaded at about 230° C. with an extruder, and the resulting pellets were vacuum-dried and subjected to injection molding at about 230° C. to prepare a test piece. The flammability and mechanical strength of the test piece were determined. The results are shown in Table 6.

TABLE 5

| Example | Flame-retardant | Amount | $M^{2+}$ | x of formula (1) |
|---|---|---|---|---|
| Example | | | | |
| 16 | Example 6 | 45 | Co | 0.02 |
| 17 | Example 7 | 45 | Mn | 0.01 |
| 18 | Example 8 | 45 | Fe | 0.02 |
| 19 | Example 9 | 45 | Cu | 0.01 |
| 20 | Example 10 | 45 | Zn, Ni | 0.01 |
| Comparative Example | | | | |
| 7 | Comparative Example 1 | 70 | — | 0 |

Note:
In the respective Examples and Comparative Examples, 0.2 parts of Irganox was formulated as the antioxidant.

0.2 parts of Irganox was formulated as the antioxidant.

TABLE 6

| | Combustibility | Tensile strength (kg · f/mm²) | Izod impact strength (kg · cm/cm) |
|---|---|---|---|
| EXAMPLE | | | |
| 16 | V-0 | 8.50 | 3.1 |
| 17 | V-0 | 8.45 | 3.2 |
| 18 | V-0 | 8.30 | 3.2 |
| 19 | V-0 | 8.20 | 3.0 |
| 20 | V-0 | 8.52 | 3.2 |

TABLE 6-continued

|  | Combustibility | Tensile strength (kg · f/mm$^2$) | Izod impact strength (kg · cm/cm) |
|---|---|---|---|
| COMPARATIVE EXAMPLE | | | |
| 7 | V-0 | 7.50 | 2.4 |

Note:
The combustibility was determined using a test piece of 1/8 inch in thickness according to a UL94VE test.

The izod impact strength test (with notch) was conducted using a test piece of 1/8 inch in thickness.

As is shown in the results of Tables 5 and 6, the minimum amount of magnesium hydroxide required to meet the "V-0" level of a UL94VE test in the combustibility test using a test piece of 1/8 inch in thickness was 70 parts. On the other hand, in case of the non-uniformly distributed solid solution of the present invention, it was possible to meet the "V-0" level when using 45 parts (minimum amount) of it in combination with 1 to 2 molar % of cobalt.

EFFECT OF THE INVENTION

According to the present invention, a magnesium hydroxide solid solution wherein a divalent metal ion such as Mn, Fe, Co, Ni and the like is non-uniformly distributed in the vicinity of the surface of the respective crystals, a flame-retardant containing the magnesium hydroxide solid solution as an active component, a flame-retardant resin composition wherein the flame-retardant is formulated in a resin and/or rubber, and a process for producing the magnesium hydroxide solid solution are provided. This magnesium hydroxide solid solution affords excellent characteristics of the flame-retardant in comparison with the magnesium hydroxide solid solution wherein the divalent metal ion is uniformly distributed, if only a small amount of the divalent metal ion is used.

What is claimed is:

1. Crystals of a magnesium hydroxide solid solution of the formula $Mg_{1-x}M^{2+}{}_x(OH)_2$, wherein $M^{2+}$ denotes at least one divalent metal ion selected from the group consisting of $Mn^{2+}$, $Fe^{2+}$, $Co^{2+}$, $Ni^{2+}$, $Cu^{2+}$ and $Zn^{2+}$; and $0.001 \leq x < 0.5$; and wherein the concentration of $M^{2+}$ in the vicinity of the surface of the crystals is at least twice the average concentration of $M^{2+}$ in the crystals.

2. A flame retardant resin and/or rubber composition comprising 20 to 250 parts of the magnesium hydroxide solid solution according to claim 1 per 100 parts of the resin and/or rubber.

3. A flame retardant resin and/or rubber composition according to claim 2, wherein $M^{2+}$ is at least one of $Ni^{2+}$ and $Mn^{2+}$.

4. A flame retardant resin and/or rubber composition according to claim 2, wherein the surfaces of the magnesium hydroxide solid solution crystals are treated with at least one surface treating material selected from the group consisting of higher fatty acids and alkali metal salts thereof, anionic surfactants, phosphate esters, silane coupling agents, titanate coupling agents, aluminum coupling agents, and esters derived from multivalent alcohols and fatty acids.

5. A flame retardant material consisting essentially of crystals of a magnesium hydroxide solid solution of the formula $Mg_{1-x}M^{2+}{}_x(OH)_2$, wherein $M^{2+}$ denotes at least one divalent metal selected from the group consisting of $Mn^{2+}$, $Fe^{2+}$, $Co^{2+}$, $Ni^{2+}$, $Cu^{2+}$ and $Zn^{2+}$; and $0.001 \leq x < 0.5$; and wherein the concentration of $M^{2+}$ in the vicinity of the surface of the crystals is at least twice the average concentration of $M^{2+}$ in the crystals.

6. A method of producing a magnesium hydroxide solid solution, which comprises:

hydrothermally treating an aqueous dispersion of finely divided magnesium hydroxide;

adding, with stirring, an aqueous solution containing at least one divalent metal ion selected from the group consisting of $Mn^{2+}$, $Fe^{2+}$, $Co^{2+}$, $Ni^{2+}$, $Cu^{2+}$ and $Zn^{2+}$, to the dispersion of the hydrothermally treated magnesium hydroxide; and reacting the hydrothermally treated magnesium hydroxide with said at least one divalent metal ion.

7. A method according to claim 6, wherein the aqueous dispersion of finely divided magnesium hydroxide is prepared by reacting magnesium chloride with calcium hydroxide.

8. A method of according to claim 6, wherein the aqueous dispersion additionally contains at least one chloride selected from the group consisting of magnesium chloride, calcium chloride and sodium chloride.

* * * * *